United States Patent
Blumer

(10) Patent No.: US 10,407,164 B2
(45) Date of Patent: Sep. 10, 2019

(54) AIR DISTRIBUTION SYSTEM WITH DRAG REDUCING INLET

(71) Applicant: HONEYWELL INTERNATIONAL INC., Morris Plains, NJ (US)

(72) Inventor: Eric Blumer, Scottsdale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 309 days.

(21) Appl. No.: 15/336,875

(22) Filed: Oct. 28, 2016

(65) Prior Publication Data
US 2018/0118331 A1 May 3, 2018

(51) Int. Cl.
| B64C 21/06 | (2006.01) |
| B64D 13/02 | (2006.01) |
| B64D 15/00 | (2006.01) |
| B64D 13/08 | (2006.01) |
| B64D 15/04 | (2006.01) |
| B64C 23/06 | (2006.01) |
| B64D 13/06 | (2006.01) |

(52) U.S. Cl.
CPC ............ *B64C 21/06* (2013.01); *B64C 23/069* (2017.05); *B64D 13/02* (2013.01); *B64D 13/08* (2013.01); *B64D 15/00* (2013.01); *B64D 15/04* (2013.01); *B64C 2230/06* (2013.01); *B64D 2013/0603* (2013.01); *Y02T 50/164* (2013.01); *Y02T 50/166* (2013.01); *Y02T 50/54* (2013.01)

(58) Field of Classification Search
CPC ....... B64C 21/06; B64C 21/025; B64C 21/08; B64C 2230/00; B64C 2230/06; B64C 23/065; B64C 23/069; B64C 23/072; B64C 23/076
See application file for complete search history.

(56) References Cited

U.S. PATENT DOCUMENTS

| 2,751,168 A | * | 6/1956 | Stalker | B64C 21/06 |
| | | | | 244/15 |
| 3,981,466 A | | 9/1976 | Shah | |
| 4,382,569 A | * | 5/1983 | Boppe | B64C 23/065 |
| | | | | 244/199.4 |
| 5,114,103 A | | 5/1992 | Coffinberry | |
| 5,150,859 A | * | 9/1992 | Ransick | B64C 23/065 |
| | | | | 244/58 |

(Continued)

FOREIGN PATENT DOCUMENTS

EP 2644497 A1 10/2013

OTHER PUBLICATIONS

James H Paluh, "Metallic Flexible Coupling Service Life and Failure Modes", Brochure of Ameridrives Couplings, An Altra Industrial Motion company, as originally seen in Hydrocarbons Processing, Jan. 1996 and as re-printed in Feb. 2014.

(Continued)

*Primary Examiner* — Philip J Bonzell
*Assistant Examiner* — Tye William Abell
(74) *Attorney, Agent, or Firm* — Shimokaji IP

(57) ABSTRACT

A system for reducing drag on an aircraft includes an ambient air inlet positioned in or near a wingtip fence and or winglet of the aircraft and an air pressurization device, such as an air compressor, coupled to the ambient air inlet. The air pressurization device has an inlet oriented toward the ambient air inlet. The air pressurization device has an outlet oriented toward an interior of the aircraft.

4 Claims, 2 Drawing Sheets

(56) References Cited

U.S. PATENT DOCUMENTS

| | | | |
|---|---|---|---|
| 5,263,667 A | 11/1993 | Horstman | |
| 8,651,427 B1* | 2/2014 | Malachowski | B64C 23/069 |
| | | | 244/199.4 |
| 2013/0320150 A1* | 12/2013 | Reckzeh | B64C 21/02 |
| | | | 244/199.4 |
| 2018/0050790 A1* | 2/2018 | Whitehouse | B64C 23/069 |
| 2018/0201364 A1* | 7/2018 | Smith | B64C 23/069 |
| 2018/0305019 A1* | 10/2018 | Hubschwerlen | B64C 21/02 |

OTHER PUBLICATIONS

Extended Search Report from EP application No. 17197884.4 dated Feb. 6, 2018.

* cited by examiner

AIR DISTRIBUTION SYSTEM WITH DRAG REDUCING INLET

BACKGROUND OF THE INVENTION

The present invention relates generally to providing pressurized air to perform various functions on an aircraft. More particularly, the invention relates to systems for extracting ambient air from exterior surfaces of the aircraft to reduce drag and conveying the air so that the various functions are performed during its conveyance.

Electric Cabin Air Compressors (CAC) may be used in conjunction with efficient More Electric Aircraft (MEA) architectures to provide outside compressed air to Environmental Control Systems (ECS), to pressurize the cabin, provide fresh outside air and to control the temperature in aircraft. In current MEA applications, CAC inlets may recover dynamic ram air pressure during flight in order to gain a pressure and efficiency advantage. But this ram air system may have a negative effect of adding drag to the aircraft In many prior-art aircraft, wing leading edge anti-icing is performed with high pressure and high temperature main engine bleed air that is dumped overboard via an impingement flow piccolo tube which heats up the wing leading edge. This bleed air requires additional fuel burn by the engine, and can be a difficult design point for the engines and aircraft to meet.

In prior art environmental control systems (ECS), engine bleed air is commonly routed directly to a precooler near a main engine to reduce bleed air temperatures to an acceptable level as to not damage aircraft structures, equipment or provide an ignition source. These precoolers cause pressure drop, add weight, and require engine fan air or ram air. Consequently, these precoolers reduce aircraft efficiency.

As can be seen, there is a need for an air inlet system which reduces drag on an in-flight aircraft. Also, there is a need for a wing anti-icing system that does not consume bleed air from main engines of an aircraft. Still further, there is a need for a bleed air precooling system that does not reduce aircraft efficiency.

SUMMARY OF THE INVENTION

In one aspect of the present invention, a system for reducing drag on an aircraft, the system comprises an ambient air inlet positioned in a wingtip fence or winglet of the aircraft; and an air pressurization device coupled to the ambient air inlet, wherein the air pressurization device has an inlet oriented toward the ambient air inlet; and wherein the air pressurization device has an outlet oriented toward an interior of the aircraft.

In another aspect of the present invention, an anti-icing system for a wing of an aircraft comprises; an air compressor positioned within an outboard end of the wing; and a heat transfer anti-icing duct coupled to an outlet of the air compressor; wherein the heat transfer duct is positioned along a leading edge of the wing.

In still another aspect of the present invention, an environmental control system (ECS) comprises a heat exchanger; and an air pressurization device; wherein the air pressurization device is coupled to an ambient air inlet located at an outboard end of a wing of the aircraft; wherein an outlet of the air pressurization device is coupled to the heat exchanger; and wherein the pressurized air passes through the heat exchanger.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally may provide a system for performing various functions on an aircraft with pressurized air from a cabin air compressor (CAC) or a fan. More particularly, the invention may provide systems for extracting ambient air from exterior surfaces of the aircraft while reducing drag. The compressed air may be conveyed in a manner that allows the various functions to be performed during its conveyance.

Figure 1:
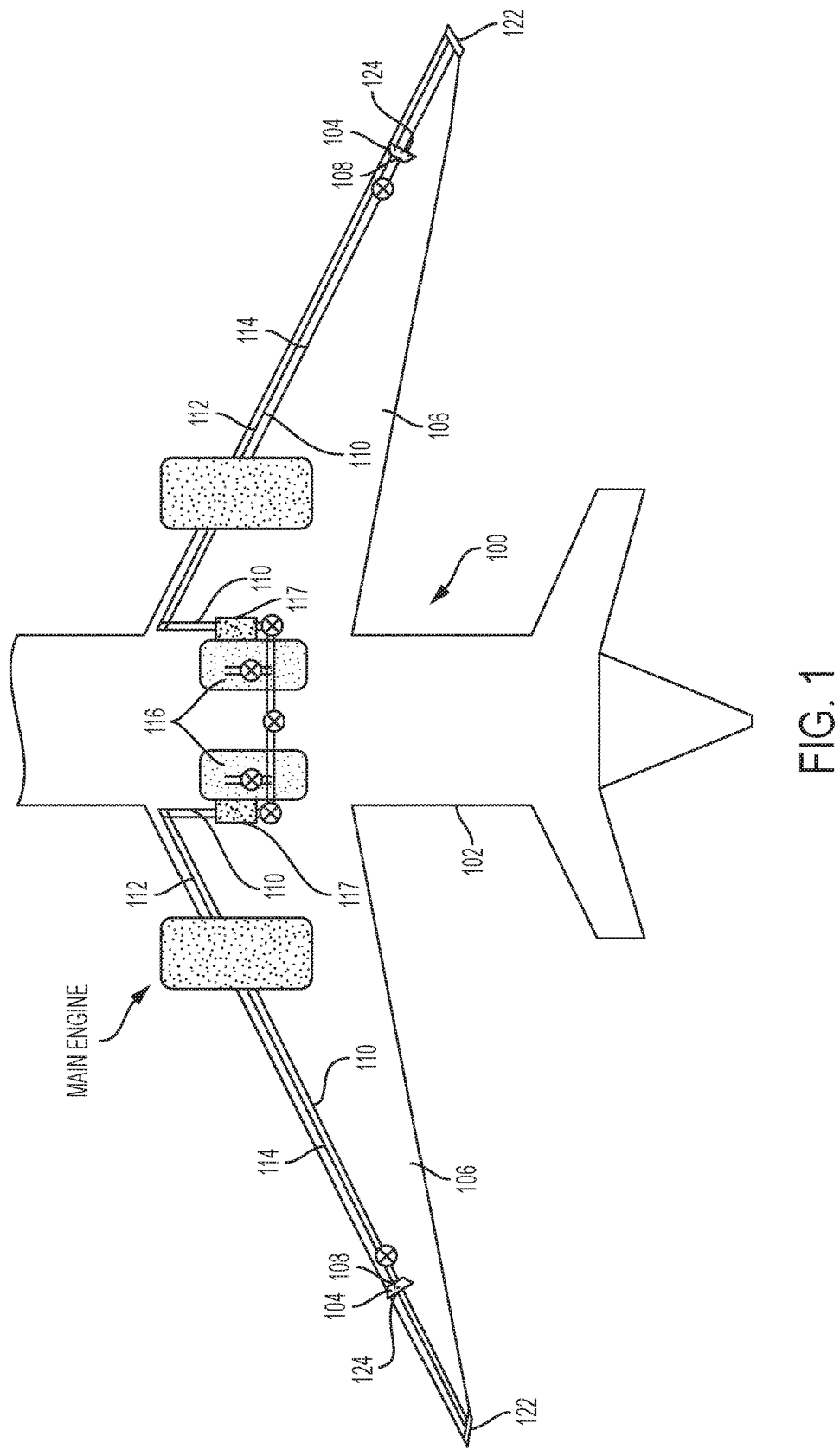
FIG. 1 is a schematic diagram of air distribution system for a More Electric Aircraft (MEA) in accordance with an exemplary embodiment of the invention.

Referring now to FIG. 1, an exemplary embodiment of an aircraft air conveyance system 100 is schematically illustrated as it may be installed in a more electric aircraft (MEA) 102. Air pressurization devices such as air compressors 104 may be positioned in wings 106 of the aircraft 102. The compressors 104 may be electrically powered. The compressors 104 may have inlets 124 oriented toward an ambient air inlet 120 and outlets 108 oriented toward an interior of the aircraft. Outlets 108 of the compressors may be connected with compressed air ducts 110. In an exemplary embodiment, portions of the compressed air ducts 110 may be configured to function as wing leading-edge anti-icing devices 112.

As compressed air 114 emerges from the compressors 104, the compressed air 114 is hot. In that regard, the compressed air 114 that passes through the anti-icing devices 112 may be ideally suited to perform an anti-icing role. As the compressed air 114 passes progressively along the length of the wings 106, heat may transfer out of the compressed air 114 and the compressed air 114 may be cooled. As the compressed air 114 completes its passage along the lengths of the wings 106, the compressed air 114 may be cooled sufficiently so that it may be introduced into an environmental control system (ECS) 116 of the aircraft without a need to pass the compressed air 114 through a precooler (not shown). In other words, in distinction from prior art systems, there may be no need to provide the aircraft 102 with a ram-air or engine fan-air cooled precooler. In an exemplary embodiment, heat exchangers 117 may utilize pressurized air from the air ducts 110 to augment cooling or heating within an environmental control system (ECS) 116.

Figure 2:
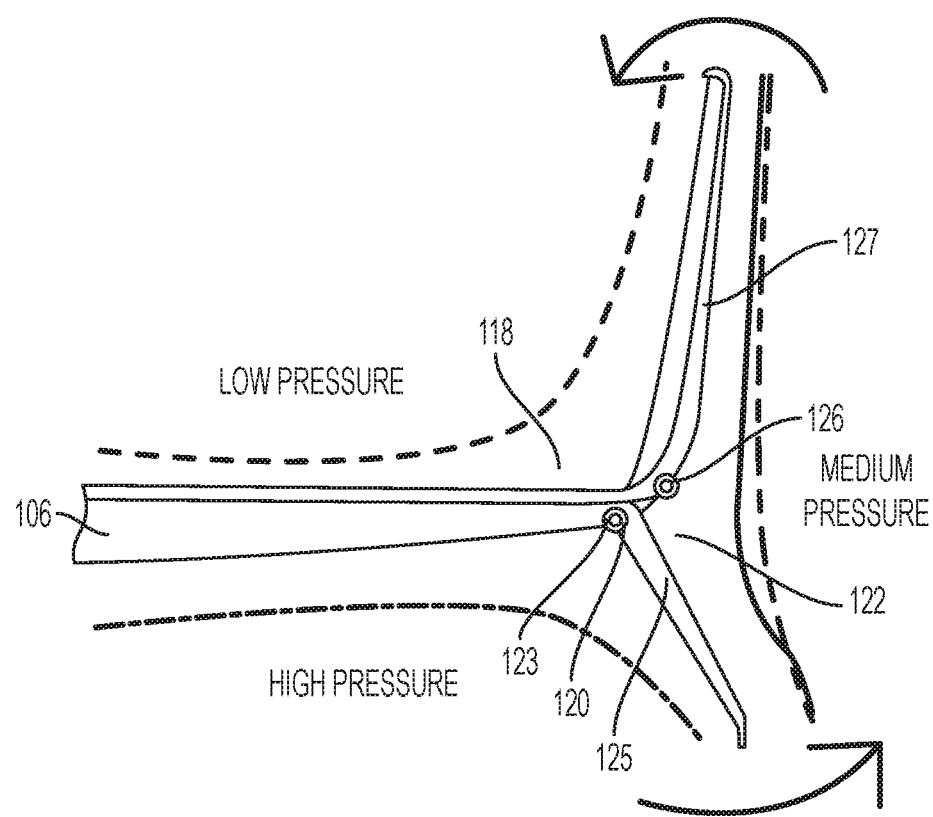
FIG. 2 is an elevation view of an ambient air inlet for an aircraft in accordance with an exemplary embodiment of the invention.

Referring now to FIG. 2, a detailed view of an outboard end 118 of one of the wings 106 shows an exemplary embodiment of an aperture or air inlet 120. In an exemplary embodiment, the air inlet 120 may be positioned at or near the outboard end 118, such as on the underside or high-pressure side of the wing 106. More particularly, the air inlet 120 may be positioned at a juncture 123 of the wing 106 and a winglet or wingtip fence 122 In that regard, the air inlet 120 may be considered to be positioned on a high-pressure side 125 of the wingtip fence 122. In another exemplary embodiment an air inlet 126 may be positioned on an outboard or medium-pressure side 127 of the wingtip fence 122. The air inlet 120 or 126 may be connected with an inlet 124 of the air compressor 104 of FIG. 1.

Advantageously, placing the air inlet 120 on the high pressure side of fence 122 may capture some air that would otherwise leak around the wing tips. Wing tip vortices may also be reduced. Such leakage and vortices cause lift induced drag. Reducing such leakage and vortices may result in a winglet or wingtip fence that eliminates more lift induced drag than a winglet or fence of similar size and geometry. Additionally, such placement of the air inlet 120 may reduce drag that might otherwise occur with use of prior art ram air inlets (not shown).

It should be understood, of course, that the foregoing relates to exemplary embodiments of the invention and that modifications may be made without departing from the spirit and scope of the invention as set forth in the following claims.

I claim:

1. A system for reducing drag on an aircraft having a wing and, at a distal end thereof, a wingtip fence, wherein the wingtip fence has a high pressure side and an opposite low pressure side, wherein the high pressure side is at an underside of the wing, the system comprising:
   an ambient air inlet positioned on only the high pressure side of the wingtip fence;
   wherein the air inlet is positioned only at a juncture of the wing and the wingtip fence; and
   an air pressurization device coupled to the ambient air inlet;
   wherein the air pressurization device has an inlet oriented toward the ambient air inlet; and
   wherein the air pressurization device has an outlet oriented toward an interior of the aircraft.

2. The system of claim 1 wherein the air pressurization device is positioned in the wing of the aircraft.

3. The system of claim 1 wherein the air pressurization device is an air compressor.

4. The system of claim 3 wherein the air compressor is electrically powered.

* * * * *